(12) United States Patent
Khasnis et al.

(10) Patent No.: US 12,381,761 B2
(45) Date of Patent: Aug. 5, 2025

(54) SYSTEM AND METHOD FOR CHANNEL ESTIMATION IN SC-FDMA/OFDM BASED RADIO ACCESS TECHNOLOGIES

(71) Applicant: Signalchip Innovations Private Limited, Bangalore (IN)

(72) Inventors: Himamshu Gopalakrishna Khasnis, Bangalore (IN); Navaneetha Krishnamurthy, Bangalore (IN)

(73) Assignee: SIGNALCHIP INNOVATIONS PRIVATE LIMITED, Bangalore (IN)

( * ) Notice: Subject to any disclaimer, the term of this patent is extended or adjusted under 35 U.S.C. 154(b) by 392 days.

(21) Appl. No.: 18/110,307

(22) Filed: Feb. 15, 2023

(65) Prior Publication Data
US 2023/0261907 A1    Aug. 17, 2023

(30) Foreign Application Priority Data
Feb. 15, 2022   (IN) .............................. 202241008021

(51) Int. Cl.
*H04L 25/02* (2006.01)
(52) U.S. Cl.
CPC ........ *H04L 25/025* (2013.01); *H04L 25/0224* (2013.01)

(58) Field of Classification Search
CPC .......................... H04L 25/025; H04L 25/0224
See application file for complete search history.

(56) References Cited

U.S. PATENT DOCUMENTS

2017/0374675 A1* 12/2017 Hwang ................. H04W 72/04

* cited by examiner

*Primary Examiner* — Natasha W Cosme

(57) ABSTRACT

A method for reducing a memory requirement in an uplink receiver using a Sounding Reference Signal (SRS) channel along with a Demodulation Reference Signal (DMRS) for channel estimation in SC-FDMA/OFDM based radio access technologies is provided. The method includes (i) requesting the Sounding Reference Signal (SRS) and receiving the Sounding Reference Signal (SRS), by a base station, from at least one user device and performing corresponding channel estimation, (ii) scheduling, by the base station, at least one of a data or control channel transmission, and (iii) demodulating, using a SC-FDMA/OFDM demodulator, received SC-FDMA/OFDM symbols that corresponds to at least one of the data or control channel transmission scheduled by the base station and saving the demodulated SC-FDMA/OFDM symbols for one DMRS interval in a buffer until channel estimation is ready, thereby reducing the memory requirement of the uplink receiver.

10 Claims, 4 Drawing Sheets

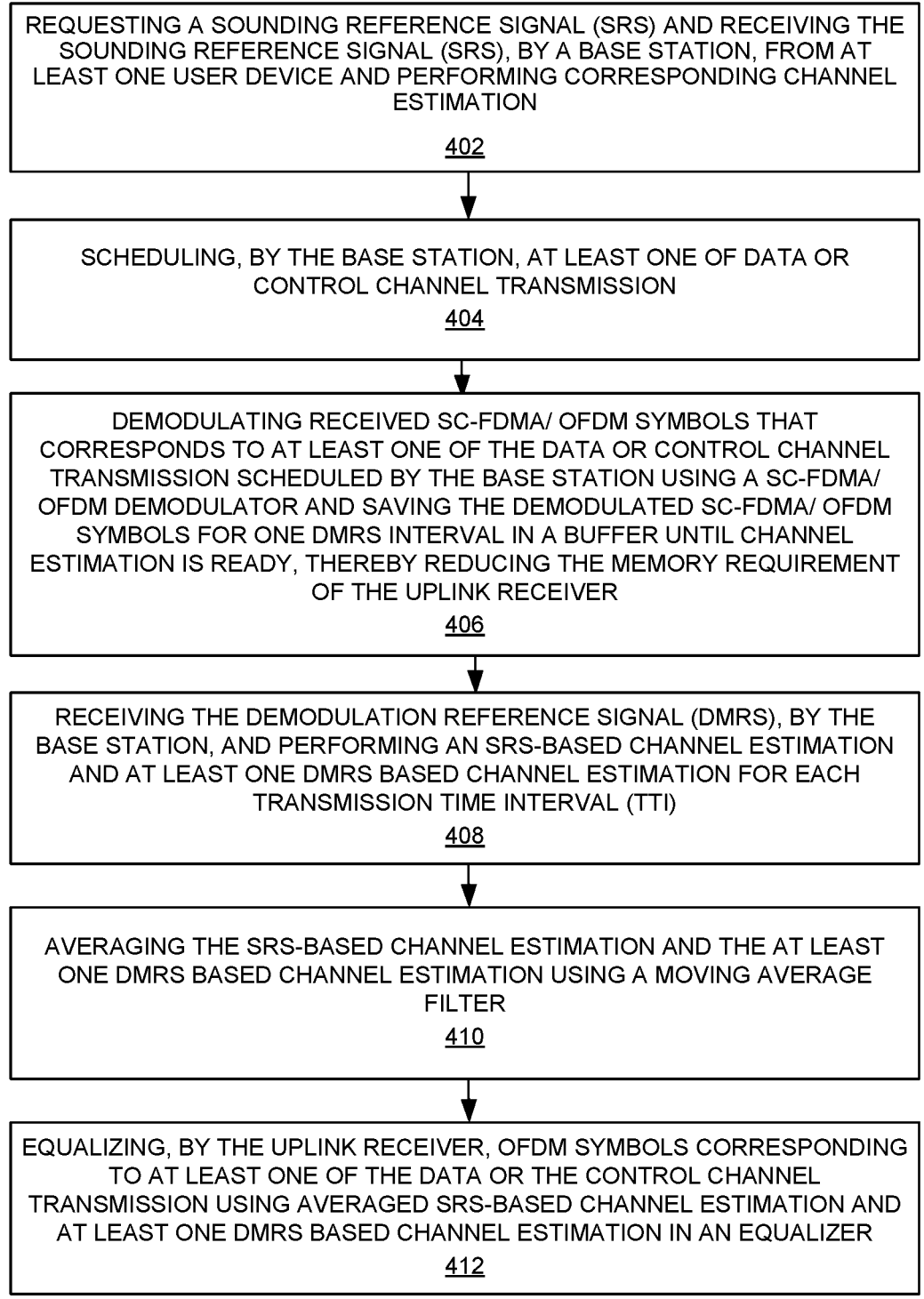
FIG. 4                    400

SYSTEM AND METHOD FOR CHANNEL ESTIMATION IN SC-FDMA/OFDM BASED RADIO ACCESS TECHNOLOGIES

CROSS-REFERENCE TO RELATED APPLICATIONS

This application claims priority to the Indian provisional patent application no. 202241008021 filed on Feb. 15, 2022, the complete disclosures of which, in their entirety, are herein incorporated by reference.

BACKGROUND

Technical Field

The embodiments herein generally relate to radio access technologies, and more particularly, to a system and method for channel estimation in SC-FDMA/OFDM based radio access technologies for reducing memory requirements.

Description of the Related Art

Wireless products and services have continued to expand to the point that finite resources available for communication are being overwhelmed. The industry has been forced to make dramatic changes, as it must adapt to accommodate the exponential demand on memory requirement, efficiency, and reliability.

FIG. 1 is a block diagram that illustrates an uplink receiver implemented in radio access technologies according to the prior art. In some embodiments, a physical layer in the radio communication system includes reference signals and physical channels. The reference signals are used for channel estimation and other measurement purposes. In some embodiments, the reference signals enable the successful reception of data and control channels. The reference channels in an uplink of the radio communication system include a demodulation reference signal (DMRS) and a sounding reference signal (SRS). In some embodiments, uplink physical channels include a physical uplink control channel (PUCCH), a physical uplink shared channel (PUSCH) and a physical random access channel (PRACH). The uplink receiver 100 includes a SC-FDMA/OFDM demodulator 102, a channel estimation unit 104, a block average unit 106, an equalizer 108 and a buffer 110. The SC-FDMA/OFDM demodulator 102 demodulates the received digital, baseband signal.

The channel estimation unit 104 uses DMRS transmitted by a user equipment to determine a frequency response of a channel. The frequency response estimated from channel estimation unit 104 is used to correct a channel impairment present in data and control channels by the equalizer 108. In some embodiments, demodulation reference signal (DMRS) is transmitted by the user equipment two or more times every transmission time interval (TTI) based on a radio access technology and a network configuration. A base station does channel estimation every time the demodulation reference signal (DMRS) is received. The equalization can be performed every time when the demodulation reference signal (DMRS) is received.

In some embodiments, when the channel estimation is averaged from multiple measurements, the uplink receiver's 100 performance improves significantly. This is because a noise variance in the channel estimation reduces by as many times as an amount of averaging. To perform averaging before equalization, the uplink receiver 100 needs to store received symbols at the output of SC-FDMA/OFDM demodulator 102 for averaging intervals before equalization. The memory requirement to store the received symbols is very high. For example, in LTE 20 MHz bandwidth mode with 4 antenna receivers, for averaging 2 times, the number of bits required in memory will be 1.88 M bits (1200 subcarriers×14 symbols×(2×14) bits per IQ sample×4 antennas).

Therefore, there arises a need to address the technical drawbacks in existing technologies to reduce the memory requirement in the uplink receiver implemented in the radio access technologies.

SUMMARY

In view of the foregoing, embodiments herein provide a method for reducing the memory requirement of an uplink receiver using a Sounding Reference Signal (SRS) along with a Demodulation Reference Signal (DMRS) for channel estimation in SC-FDMA/OFDM based radio access technologies. The method includes requesting the Sounding Reference Signal (SRS) and receiving the Sounding Reference Signal (SRS), by a base station, from at least one user device and performing corresponding channel estimation. The method includes scheduling, by the base station, at least one of a data or control channel transmission. The method includes demodulating, using a SC-FDMA/OFDM demodulator, received SC-FDMA/OFDM symbols that corresponds to at least one of the data or control channel transmission scheduled by the base station and saving the demodulated SC-FDMA/OFDM symbols for one DMRS interval in a buffer until channel estimation is ready, thereby reducing the memory requirement of the uplink receiver. The method includes receiving the demodulation Reference Signal (DMRS), by the base station, and performing an SRS-based channel estimation and at least one DMRS based channel estimation for each transmission time interval (TTI). The method includes averaging the SRS-based channel estimation and the at least one DMRS based channel estimation using a moving average filter. The method includes equalizing, by the uplink receiver, OFDM symbols corresponding to at least one of data or control channel transmission using averaged SRS-based channel estimation and at least one DMRS based channel estimation in an equalizer.

In some embodiments, when intended averaging is two times, an averaged channel estimation is available upon receiving DMRS each time instead of waiting for two DMRS intervals.

In some embodiments, the SRS and the DMRS based channel estimations are averaged over 'n' number of the SRS-based channel estimation or the at least one DMRS based channel estimation.

In some embodiments, the averaging of the DMRS and SRS based channel estimates improves the Mean Square Error of the final estimate used in the equalizer, thereby providing gains in effective SNR.

In some embodiments, the base station schedules the SRS for a user equipment on the transmission time interval (TTI) before scheduling Physical Uplink Shared Channel (PUSCH).

In one aspect, a system for reducing the memory requirement of an uplink receiver using a Sounding Reference Signal (SRS) along with a Demodulation Reference Signal (DMRS) for channel estimation in SC-FDMA/OFDM based radio access technologies. The system includes a base station that includes the uplink receiver. The uplink receiver includes a SC-FDMA/OFDM demodulator, a moving average filter, a buffer and an equalizer. The base station requests the Sounding Reference Signal (SRS) and receives the Sounding Reference Signal (SRS), from at least one user device and performs the corresponding channel estimation. The base station schedules at least one of data or control channel transmission. The SC-FDMA/OFDM demodulator demodulates received SC-FDMA/OFDM symbols that corresponds to at least one of the data or control channel transmission scheduled by the base station using a SC-FDMA/OFDM demodulator and saving the demodulated SC-FDMA/OFDM symbols for one DMRS interval in a buffer until channel estimation is ready, thereby reducing the memory requirement of the uplink receiver. The base station receives demodulation Reference Signal (DMRS) and performs an SRS-based channel estimation and at least one DMRS based channel estimation for each transmission time interval (TTI). The moving average filter averages the Sounding Reference Signal (SRS) and the Demodulation Reference Signal (DMRS) based channel estimations. The uplink receiver equalizes OFDM symbols corresponding to at least one of data or control channel transmission using averaged SRS-based channel estimation and at least one DMRS based channel estimation in an equalizer.

In some embodiments, when intended averaging is two times, an averaged channel estimation is available upon receiving DMRS each time instead of waiting for two DMRS intervals.

In some embodiments, the SRS and the DMRS based channel estimations are averaged over 'n' number of the SRS-based channel estimation or the at least one DMRS based channel estimation.

In some embodiments, the averaging of the DMRS and SRS based channel estimates improves the Mean Square Error of the final estimate used in the equalizer, thereby providing gains in effective SNR.

In some embodiments, the base station schedules the SRS for a user equipment on the transmission time interval (TTI) before scheduling Physical Uplink Shared Channel (PUSCH).

Due to the use of the SRS in addition to the DMRS, the memory requirement for storing the samples is reduced, while achieving the same or better noise variance in channel estimates. Further, this method will improve the performance of receivers.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 4 is a flow diagram that illustrates a method for reducing a memory requirement in an uplink receiver using a Sounding Reference Signal (SRS) channel along with a Demodulation Reference Signal (DMRS) for channel estimation in SC-FDMA/OFDM based radio access technologies according to some embodiments herein.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
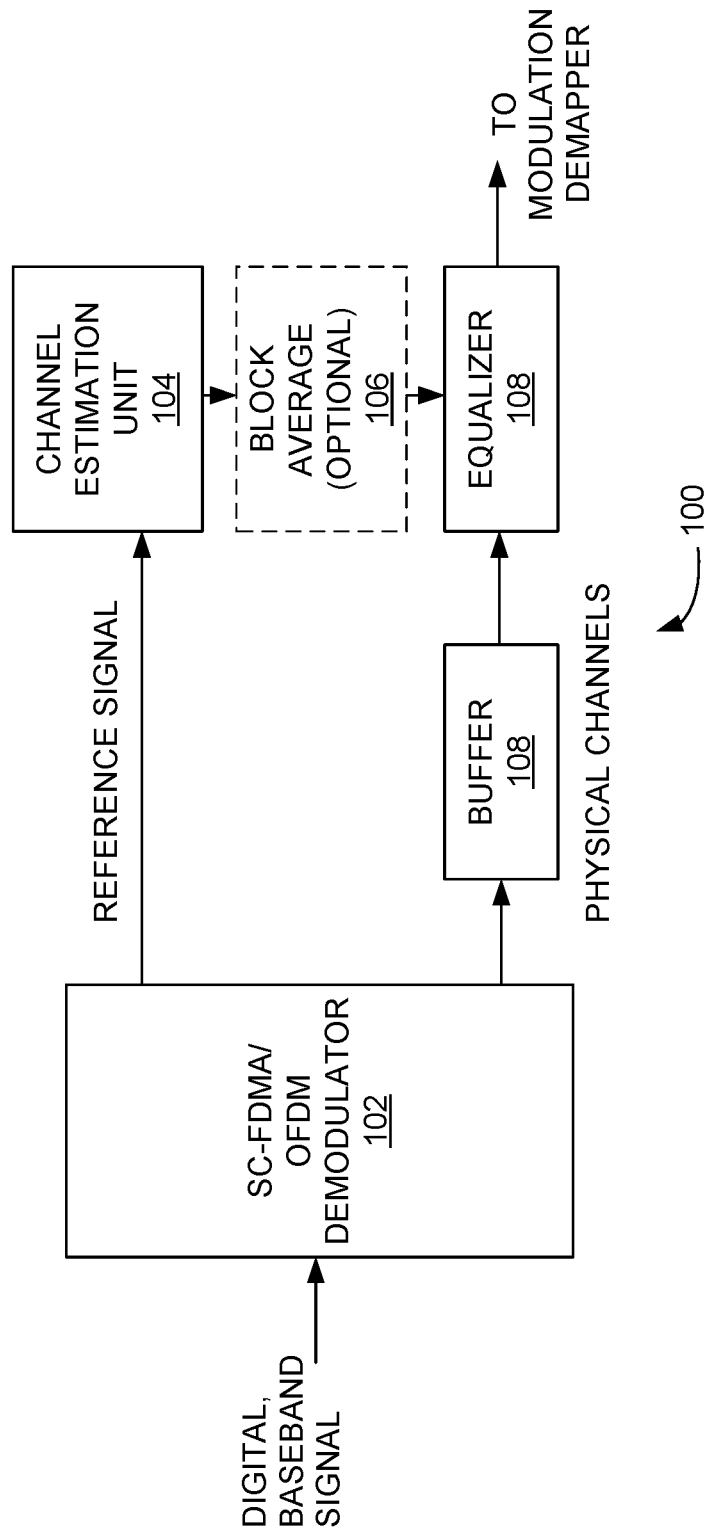
FIG. 1 is a block diagram that illustrates an uplink receiver implemented in radio access technologies according to the prior art.
Figure 2:
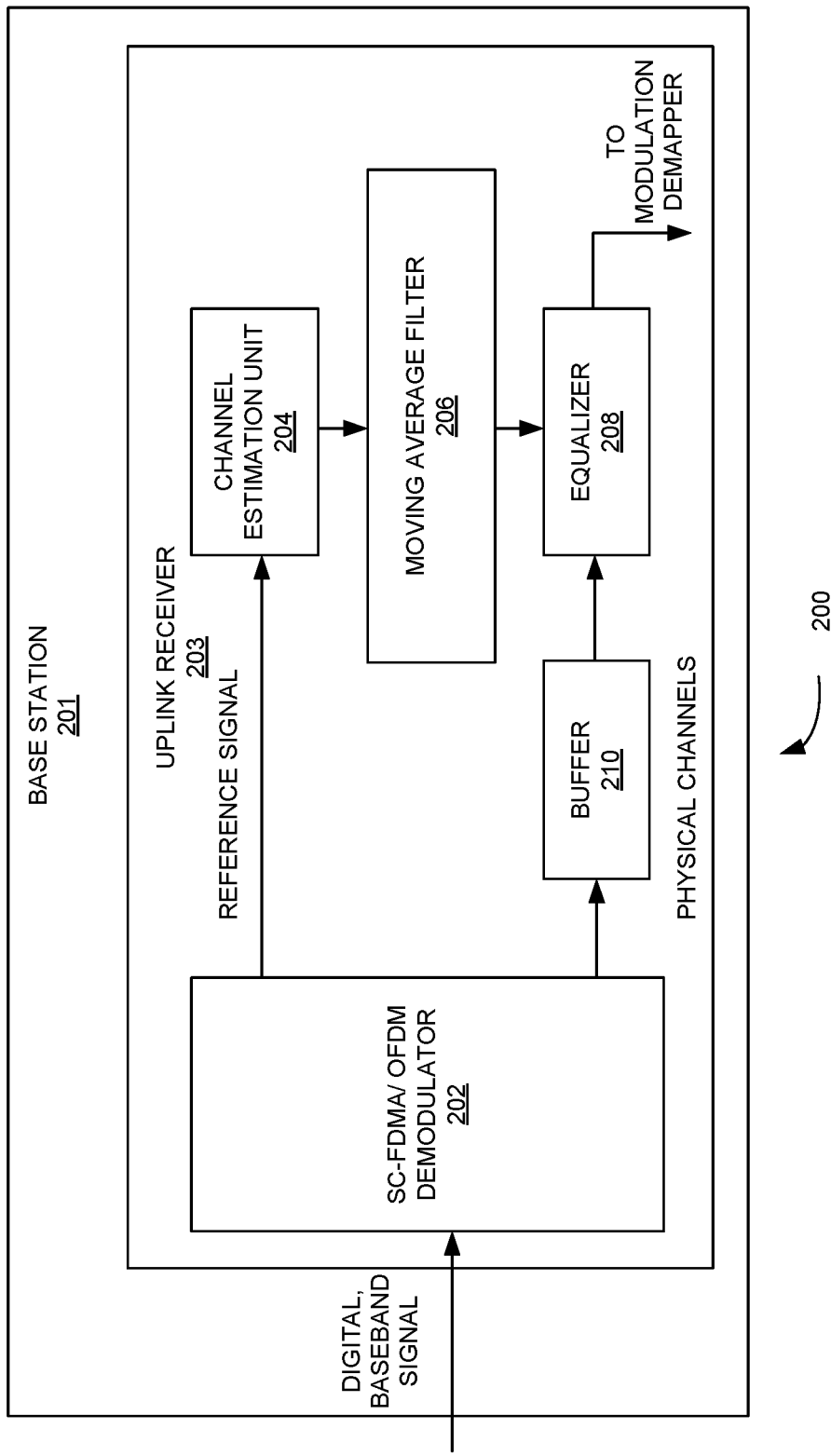
FIG. 2 is a block diagram that illustrates a system for reducing a memory requirement of an uplink receiver using a Sounding Reference Signal (SRS) along with a Demodulation Reference Signal (DMRS) for channel estimation in SC-FDMA/OFDM based radio access technologies according to some embodiments herein.
Figure 3:
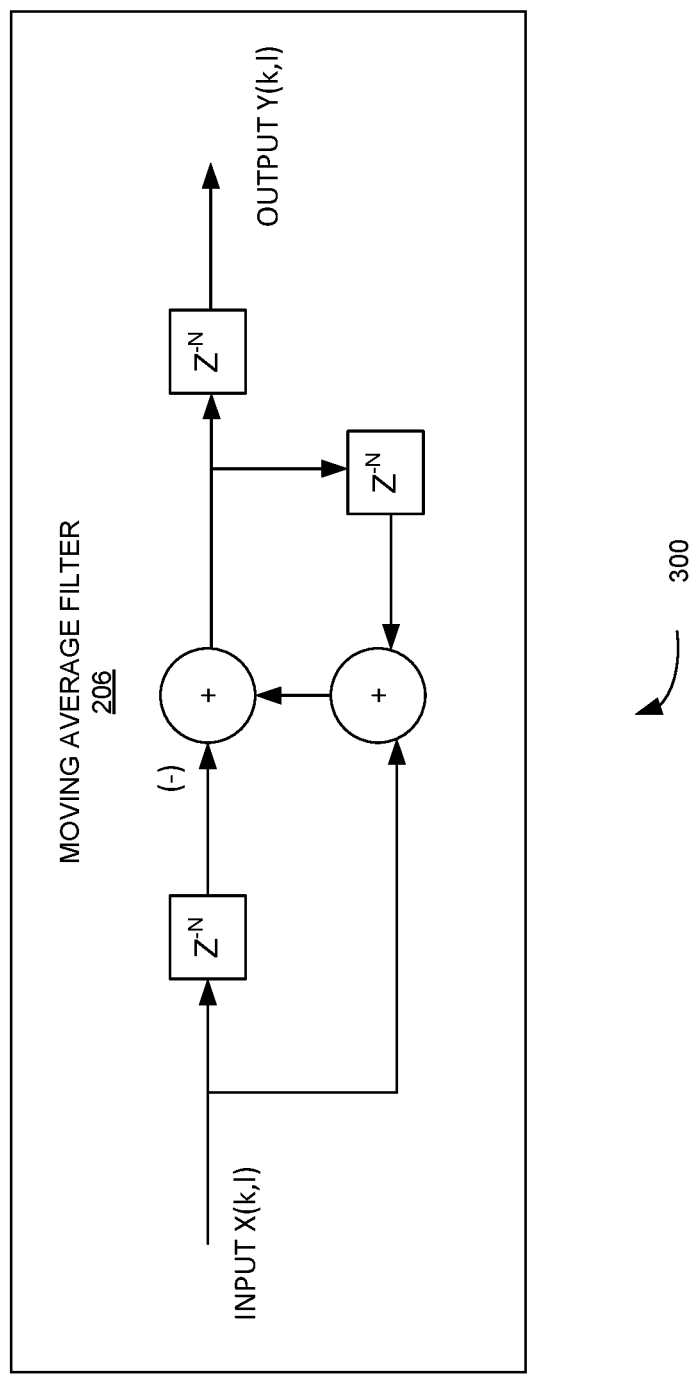
FIG. 3 is an exemplary exploded diagram a moving average filter of FIG. 2 according to some embodiments herein.

As mentioned, there remains a need for a system to reduce the memory requirement in the uplink receiver implemented in the radio access technologies. Referring now to the drawings, and more particularly to FIGS. 2 through 4, where similar reference characters denote corresponding features consistently throughout the figures, there are shown preferred embodiments.

FIG. 2 is a block diagram 200 that illustrates a system for reducing a memory requirement of an uplink receiver 203 using a Sounding Reference Signal (SRS) along with a Demodulation Reference Signal (DMRS) for channel estimation in SC-FDMA/OFDM based radio access technologies according to some embodiments herein. The block diagram 200 includes a base station 201, and the uplink receiver 203 includes a SC-FDMA/OFDM demodulator 202, a channel estimation unit 204, a moving average filter 206, an equalizer 208, and a buffer 210.

The base station 201 requests the Sounding Reference Signal (SRS) and receives the Sounding Reference Signal (SRS), from one or more user devices and performs corresponding channel estimation. In some embodiments, the corresponding channel estimation may be Minimum Mean Square Error (MMSE) estimation. In some embodiments, the one or more user devices, without limitation, may be selected from a mobile phone, a Personal Digital Assistant (PDA), a tablet, a desktop computer, or a laptop. In some embodiments, the base station 201 schedules the Sounding Reference Signal (SRS) for an user equipment one transmission time interval (TTI) before scheduling Physical Uplink Shared Channel (PUSCH). In some embodiments, the scheduled SRS is used for channel estimation along with the demodulation reference signal (DMRS). The base station 201 schedules at least one of a data or control channel transmission. The SC-FDMA/OFDM demodulator 202 demodulates received SC-FDMA/OFDM symbols that corresponds to at least one of the data or control channel transmission scheduled by the base station 201 using and saves the demodulated SC-FDMA/OFDM symbols for one DMRS interval in the buffer 210 until channel estimation is ready. Due to the use of the SRS in addition to the DMRS, the memory requirement for storing the samples is reduced, while achieving the same or better noise variance in channel estimates.

The base station 201 receives the demodulation Reference Signal (DMRS) and performs an SRS-based channel estimation and at least one DMRS based channel estimation for each transmission time interval (TTI). In some embodiments, the channel estimation unit 204 uses DMRS transmitted by a user equipment to determine a frequency response of a channel. In some embodiments, the frequency response estimated from the channel estimation unit 204 is used to correct a channel impairment present in data and control channels by the equalizer 208. The moving average filter 206 averages the SRS-based channel estimation and at least one DMRS based channel estimation. In some embodiments, the moving average filter 206 performs the SRS-based channel estimation and at least one DMRS based channel estimation for each TTI.

The uplink receiver 203 equalizes OFDM symbols corresponding to at least one of data or control channel transmission using averaged SRS-based channel estimation and at least one DMRS based channel estimation in the equalizer 208. Using an additional SRS-based channel estimation, a moving average is performed over 'n' number of the SRS-based channel estimation or the DMRS based channel estimation. In some embodiments, when intended averaging is two times, an averaged channel estimation is available upon receiving DMRS each time instead of waiting for two DMRS intervals. In some embodiments, the averaging of the DMRS and SRS based channel estimates improves a Mean Square Error of final estimate used in the equalizer 208, thereby providing gains in effective SNR. The equalization is performed by the equalizer 208 upon reception of DMRS every time. The uplink receiver 203 stores SC-FDMA/OFDM demodulated symbols for only one DMRS interval to reduce the memory requirement to half.

FIG. 3 is an exemplary exploded diagram 300 of the moving average filter 206 of FIG. 2 according to some embodiments herein. In some embodiments, input in the SRS and DMRS based channel estimates at each OFDM subcarrier. In some embodiments, k is the subcarrier index, l is the index denoting the successive channel estimates based on SRS or DMRS and N is the moving average interval. $Z^{-a}$ denotes delay by 'a' channel estimate interval. Output is related to input as:

$$Y(k, l) = \frac{X(k, l) + X(k, l-1) + \ldots + X(k, l-N+1)}{N}$$

FIG. 4 is a flow diagram that illustrates a method 400 for reducing a memory requirement in the uplink receiver 203 using a Sounding Reference Signal (SRS) channel along with a Demodulation Reference Signal (DMRS) for channel estimation in SC-FDMA/OFDM based radio access technologies according to some embodiments herein. At step 402, the method 400 includes requesting the Sounding Reference Signal (SRS) and receiving the Sounding Reference Signal (SRS), by the base station 201, from at least one user device and performing corresponding channel estimation. At step 404, the method 400 includes scheduling, by the base station 201, at least one of a data or control channel transmission. At step 406, the method 400 includes demodulating received SC-FDMA/OFDM symbols that corresponds to at least one of the data or control channel transmission scheduled by the base station 201 using the SC-FDMA/OFDM demodulator 202 and saving the demodulated SC-FDMA/OFDM symbols for one DMRS interval in a buffer until channel estimation is ready, thereby reducing the memory requirement of the uplink receiver 203. At step 408, the method 400 includes receiving the demodulation Reference Signal (DMRS), by the base station 201, and performing an SRS-based channel estimation and at least one DMRS based channel estimation for each transmission time interval (TTI). At step 410, the method 400 includes, averaging the SRS-based channel estimation and the at least one DMRS based channel estimation using a moving average filter 206. At step 412, the method 400 includes equalizing, by the uplink receiver 203, OFDM symbols corresponding to at least one of data or control channel transmission using averaged SRS-based channel estimate and at least one DMRS based channel estimate in the equalizer 208.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for reducing a memory requirement of an uplink receiver using a Sounding Reference Signal (SRS) along with a Demodulation Reference Signal (DMRS) for channel estimation in Single-carrier-Frequency division multiple access (SC-FDMA)/Orthogonal frequency-division multiplexing (OFDM) based radio access technologies, comprising:
   requesting the Sounding Reference Signal (SRS) and receiving the Sounding Reference Signal (SRS), by a base station, from at least one user device and performing corresponding channel estimation;
   scheduling, by the base station, at least one of data or control channel transmission;
   demodulating, using a SC-FDMA/OFDM demodulator, received SC-FDMA/OFDM symbols that corresponds to at least one of the data or control channel transmission scheduled by the base station and saving the demodulated SC-FDMA/OFDM symbols for one DMRS interval in a buffer until channel estimation is ready, thereby reducing the memory requirement of the uplink receiver;
   receiving the demodulation Reference Signal (DMRS), by the base station, and performing an SRS-based channel estimation and at least one DMRS based channel estimation for each transmission time interval (TTI);
   averaging the SRS-based channel estimation and the at least one DMRS based channel estimation using a moving average filter; and
   equalizing, by the uplink receiver, OFDM symbols corresponding to at least one of data or control channel transmission using averaged SRS-based channel estimation and at least one DMRS based channel estimation in an equalizer.

2. The method of claim 1, wherein when intended averaging is two times, an averaged channel estimation is available upon receiving DMRS each time instead of waiting for two DMRS intervals.

3. The method of claim 1, wherein the SRS and the DMRS based channel estimations are averaged over 'n' number of the SRS-based channel estimation or the at least one DMRS based channel estimation.

4. The method of claim 1, wherein the averaging of the DMRS and SRS based channel estimates improves a Mean Square Error of a final estimate used in the equalizer, thereby providing gains in an effective Signal-to-noise ratio (SNR).

5. The method of claim 1, wherein the base station schedules the SRS for a user equipment on the transmission time interval (TTI) before scheduling Physical Uplink Shared Channel (PUSCH).

6. A system for reducing a memory requirement of an uplink receiver using a Sounding Reference Signal (SRS) along with a Demodulation Reference Signal (DMRS) for channel estimation in Single-carrier-Frequency division multiple access (SC-FDMA)/Orthogonal frequency-division multiplexing (OFDM) based radio access technologies, comprising:
 a base station that
  requests the Sounding Reference Signal (SRS) and receives the Sounding Reference Signal (SRS), from at least one user device and performs corresponding channel estimation;
  schedules at least one of data or control channel transmission;
 a SC-FDMA/OFDM demodulator that demodulates received SC-FDMA/OFDM symbols that corresponds to at least one of the data or control channel transmission scheduled by the base station and saving the demodulated SC-FDMA/OFDM symbols for one DMRS interval in a buffer until channel estimation is ready, thereby reducing the memory requirement of the uplink receiver;
 wherein the base station receives demodulation Reference Signal (DMRS) and performs an SRS-based channel estimation and at least one DMRS based channel estimation for each transmission time interval (TTI);
 a moving average filter that averages the SRS-based channel estimation and the at least one DMRS based channel estimation; and
 wherein the uplink receiver equalizes OFDM symbols corresponding to at least one of data or control channel transmission using averaged SRS-based channel estimation and at least one DMRS based channel estimation in an equalizer.

7. The system of claim 6, wherein when intended averaging is two times, an averaged channel estimation is available upon receiving DMRS each time instead of waiting for two DMRS intervals.

8. The system of claim 6, wherein the SRS and the DMRS based channel estimations are averaged over 'n' number of the SRS-based channel estimation or the at least one DMRS based channel estimation.

9. The system of claim 6, wherein the averaging of the DMRS and SRS based channel estimates improves a Mean Square Error of a final estimate used in the equalizer, thereby providing gains in an effective Signal-to-noise ratio (SNR).

10. The system of claim 6, wherein the base station schedules the SRS for a user equipment on the transmission time interval (TTI) before scheduling Physical Uplink Shared Channel (PUSCH).

* * * * *